July 7, 1925.  1,545,386

O. BALLERT

DUMPING TRUCK

Original Filed July 22, 1922   2 Sheets-Sheet 1

Inventor:
Otto Ballert
by [signature]
Attorney

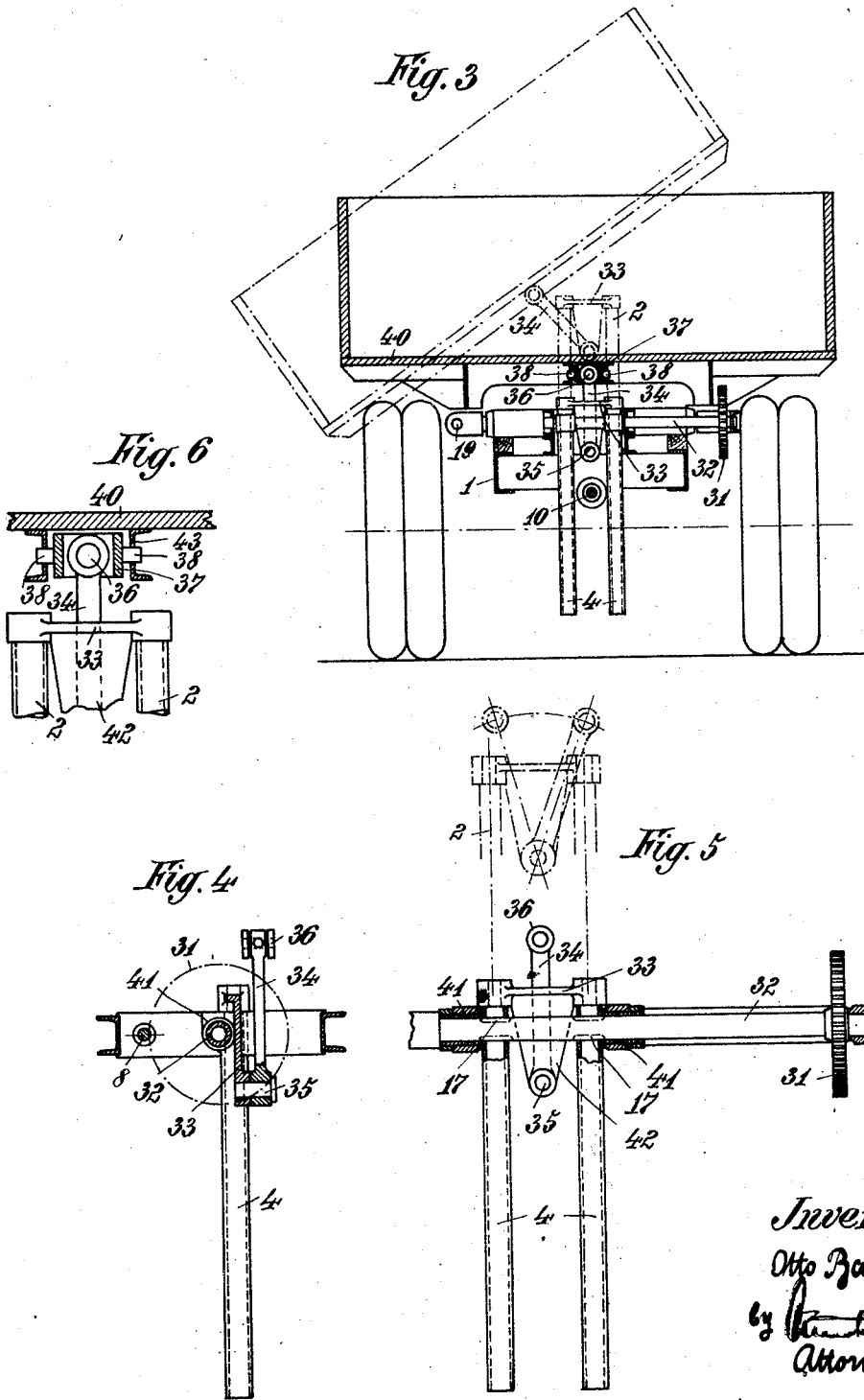

Patented July 7, 1925.

1,545,386

UNITED STATES PATENT OFFICE.

OTTO BALLERT, OF BERLIN, GERMANY.

DUMPING TRUCK.

Original application filed July 22, 1922, Serial No. 576,836. Divided and this application filed June 21, 1924. Serial No. 721,495.

*To all whom it may concern:*

Be it known that I, OTTO BALLERT, a citizen of Germany, residing at Berlin, Germany, have invented certain new and useful Improvements in Dumping Trucks, of which the following is a specification.

My invention refers to dumping trucks and more especially to mechanism for tilting the tiltable body of a dumping wagon or car. It is an object of my invention to provide means whereby the body can be tilted to the rear as well as to either side by means of a single winch or hoisting device.

This application is a division of application No. 576,836, filed July 22, 1922, now Patent No. 1,524,229, January 27, 1925.

In the drawings affixed to this specification and forming part thereof a self-propelled dumping truck embodying my invention is illustrated by way of example. In the drawings Fig. 1 is an elevation showing in dotted lines the car body tilted to the rear.

Fig. 3 is a cross-section showing in dotted lines the car body tilted to one side.

Figs. 4 and 5 are a front and side elevation, respectively, drawn to a larger scale of the hoisting mechanism proper; Fig. 6 is a section showing the universal joint connection of the winch and car body.

Figure 1:
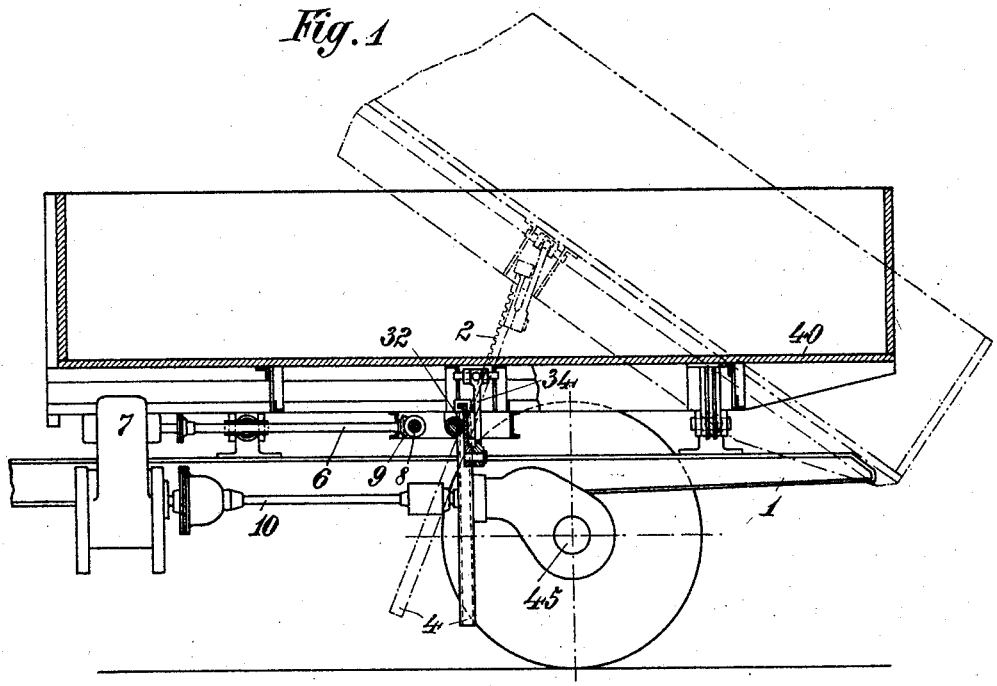
Figure 2:
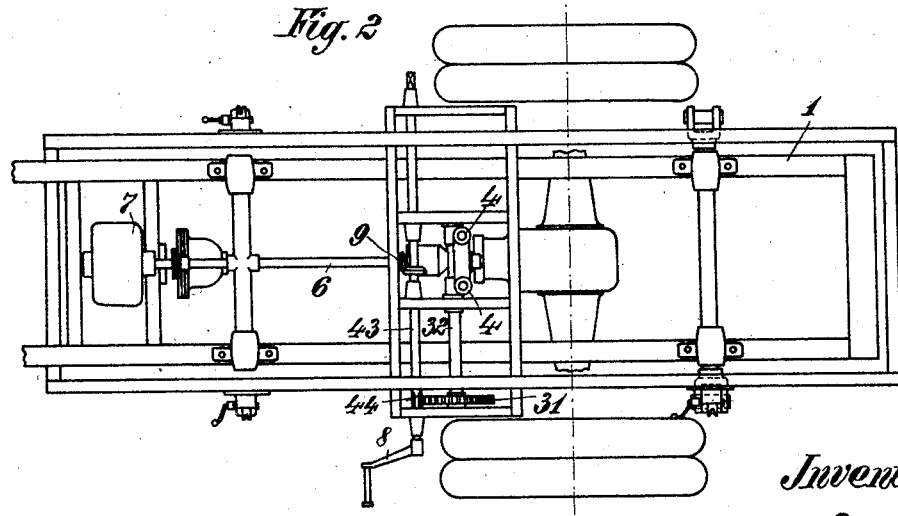
Fig. 2 is a plan view of the frame with the body removed.

Referring to the drawings, 1 is the frame of the truck and 40 is the tiltable car body mounted thereon. 32 is a shaft extending transversely across part of the frame and 4, 4 are two sleeves mounted on this shaft in parallel to each other, bearing sleeves 41 extending at right angles to the sleeves 4 embracing the shaft so that the sleeves 4 can freely rock about shaft 32 in vertical planes. In the sleeves are mounted for reciprocation racks 2, 2 gearing with teeth 17 formed in those parts of shaft 32 which face the racks, shaft 32 and racks 2, 2 forming a hoisting jack capable of rocking about this very shaft, the sleeves 4, 4 being cut out so as to allow the racks to mesh with the shaft. The upper ends of racks 2, 2 are rigidly connected by a yoke 33 carrying a downwardly extending plate 42 at the end of which is mounted a pin 35. A link 34 is pivoted to this pin at its lower end, its upper end being pivoted to a pin 36 extending across the ring 37 of a universal joint supported in brackets 43 by means of pins 38 extending at right angles to pin 36. The brackets are fixed to the bottom of the car body 40 and if the shaft 32 is rotated so as to lift the racks 2, the car body 40 will be lifted also off its seat on the frame and owing to link 34 being pivoted to plate 42 below the centre of gravity of the car body and being connected with it by a universal joint 36, 37, 38, will be free to be tilted either to the rear (Fig. 1) or sideways (Fig. 3), the racks 2 and their guiding sleeves being free to follow this tilting motion in rocking about shaft 32 (Fig. 2).

A toothed wheel 31 is mounted on the outer end of shaft 32. Another shaft 43 extending transversely across the frame 1 in parallel to shaft 32 has teeth 44 formed in that part which faces the toothed wheel 31, these teeth meshing with the toothed wheel so that by rotating shaft 43 by means of a handle 8 shaft 32 can be rotated, whereby the racks 2, 2 are raised for tilting the car body.

Shaft 43 can however also be rotated by means of the motor, if, as shown in the drawing, the truck is self-propelled, this motor (which is not shown on the drawing) being operatively connected by means of a coupling 7 with a shaft 6 extending in the longitudinal direction of the frame and operating upon shaft 43 by means of a bevel gear 9.

In the example illustrated in the drawings power is transmitted from the motor onto the rear axle 45 by means of a Cardan drive 10, and Fig. 3 clearly shows that the form of hoisting jack employed in this case comprising a pair of racks spaced apart is particularly suited for this kind of drive inasmuch as the Cardan shaft 10 which extends in the middle axis of the frame can freely pass through between the racks and these latter together with their sleeves 4 can rock freely sideways of the Cardan shaft.

I wish it to be understood that I do not desire to be limited to the exact details of construction shown and described, for obvious modifications will occur to a person skilled in the art.

I claim:—

1. Dumping truck comprising a frame, a tiltable body on said frame, a hoisting jack mounted on said frame for rocking motion in the longitudinal axis of said frame, a yoke extending downwards from the upper end of said hoisting jack; a link having its lower end pivoted to said yoke below the centre of gravity of said car body, a universal joint connecting said link with the bottom of said car body and means for operating said hoisting jack.

2. Dumping truck comprising a frame, a tiltable body on said frame, a shaft extending transversely of said frame, a hoisting jack mounted on said shaft for rocking motion, connection between said shaft and said hoisting jack for operating said hoisting jack from said shaft, a link having its lower end pivoted to said hoisting jack below the centre of gravity of said car body and a universal joint connecting the upper end of said link with the bottom of said car body.

3. Dumping truck comprising a frame, a tiltable body on said frame, a shaft extending transversely of said frame, two parallel sleeves spaced apart and mounted on said shaft for rocking motion, a rack reciprocably mounted in each sleeve, a yoke rigidly connecting the upper ends of said racks, a link having its lower end pivoted to said yoke, below the centre of gravity of said car body, a universal joint connecting the upper end of said link with the bottom of said tiltable car body and operative connection between said shaft and said racks.

In testimony whereof I affix my signature.

OTTO BALLERT.